July 31, 1956  H. DZIERGWA  2,757,305
ULTRAVIOLET LAMP
Filed May 10, 1955
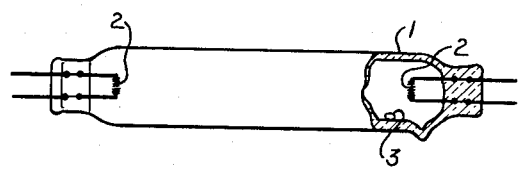
Inventor:
Herbert Dziergwa,
by Vernet G. Kauffman
His Attorney 2,757,305

Patented July 31, 1956

2,757,305

ULTRAVIOLET LAMP

Herbert Dziergwa, Berlin, Germany, assignor to Patent-Treuhand-Gesellschaft für elektrische Glühlampen m. b. H., a German company Application May 10, 1955, Serial No. 507,208

Claims priority, application Netherlands May 26, 1954

3 Claims. (Cl. 313—112)

This invention relates to discharge lamps generally, and more particularly to ultraviolet lamps, such as mercury vapor electric discharge lamps.

The sterilization of air and of liquids by means of ultraviolet radiation is gaining in favor because of its simple mode of application. The ultraviolet sources used for this purpose, commonly known as germicidal lamps, generally provide a low pressure mercury discharge within an envelope permeable to ultraviolet radiation. The greater part of the radiation emitted by such lamps lies in the region of 2500 A., specifically at 2537 A., and this radiation is particularly effective in killing microorganisms, such as bacterias and molds. However, the discharge also produces ultraviolet radiations at wave lengths below 2000 A., specifically at 1849 A., and this radiation, if allowed to be transmitted through the envelope, causes the formation of ozone which may be objectionable. It has already been proposed to suppress this formation of ozone by adding to the material of the lamp envelopes substances which absorb the ozone forming ultraviolet radiation at wave lengths below 2000 A. However, such additions generally weaken at the same time the effective ultraviolet transmission in the region of 2500 A., so that a greater number of lamps is required in order to obtain the desired sterilizing effect.

Accordingly, the object of this invention is to provide an improved ultraviolet lamp which substantially eliminates ultraviolet radiation below 2000 A. without materially affecting radiation in the region of 2500 A.

A more specific object of the invention is to provide an improved germicidal lamp which is substantially non-ozone producing.

In accordance with the invention, the ozone producing radiation from germicidal lamps may be substantially eliminated by making the envelope of quartz containing 0.01 to 0.04 per cent by weight of $TiO_2$ (titanium oxide) for the usual wall thickness of 1 millimeter. For other wall thicknesses, the percentage range of $TiO_2$ may be shifted approximately inversely as the wall thickness relative to 1 millimeter. By the term "quartz" it is intended to include both clear fused quartz made from crushed natural crystals and also other quartz, sometimes translucent, made from pure silica sand. With low pressure mercury discharge lamps having envelopes of quartz containing 0.01 to 0.04 per cent by weight of $TiO_2$ and a wall thickness of 1 millimeter, it has been found that the ozone producing radiation at wave lengths below 2000 A. is practically completely screened, whereas the sterilizing radiations in the region of 2500 A. are not yet weakened noticeably. With greater or lesser wall thicknesses, the same results may be achieved by decreasing the concentration of $TiO_2$ in the former case, or increasing it in the latter case. The instant invention thus makes it possible to produce germicidal lamps having high efficiency in the production of sterilizing radiations and which are substantially nonproductive of ozone.

In producing suitable quartz tubes for the manufacture of ozone-free germicidal lamps in accordance with the instant invention, the $TiO_2$ may be added to the rock crystal or silica sand used for the melting. The quantity of $TiO_2$ required to be added to the batch is greater than the percentage desired in the final product by the amount lost through evaporation during the melt, the volatility of $TiO_2$ being higher than that of silica. It may also be necessary to take into account that rock crystal from certain localities contain small amounts of $TiO_2$ and such amounts must be subtracted from the quantity required to be added.

During the melting of the batch, the transmission characteristics may be checked by examining pieces of quartz tube drawn therefrom with regard to their transmission of ultraviolet. A simple method of performing such an examination consists in placing the sample piece of quartz tube over a low pressure mercury discharge lamp, the wall of which consists of pure quartz, and drawing the surrounding air through a solution of KI (potassium iodide). The presence of ozone may then be detected by the resulting precipitation of iodine in the solution.

The single figure of the accompanying drawing shows by way of example a germicidal lamp in accordance with the invention which is substantially non-ozone producing. The lamp comprises an elongated tubular envelope 1 consisting of quartz containing 0.01 to 0.04 per cent by weight of $TiO_2$ and having a thickness of 1 millimeter. The lamp has a pair of electrodes 2, 2 sealed into opposite ends thereof which are here shown as being of the filamentary type activated with electron emitting materials, such as alkaline-earth oxides. The envelope also contains a filling of a starting gas, such as argon or other rare gas, at a comparatively low pressure of a few millimeters as well as a quantity of mercury, here represented by the droplet 3. The argon gas assists in the starting of the discharge which thereafter is maintained through the mercury vapor which produces its characteristic radiation including the 2537 A and 1849 A. lines.

It has been found that such lamps with a percentage of $TiO_2$ in the quartz of 0.009% by weight produce 2% ozone relative to similar lamps made of pure quartz. With a percentage of $TiO_2$ of 0.012% by weight, the generation of ozone drops to 0.33%. With a percentage of $TiO_2$ of 0.016%, the generation of ozone is less than 0.1%, whereas the radiation intensity of 2537 A. is not yet weakened noticeably. With a percentage of $TiO_2$ of 0.03% by weight relative to the quartz, no ozone could be detected, whereas the radiation intensity at 2537 A. amounted to 89% of that of a corresponding lamp having an envelope of pure quartz. It is thus seen that for optimum results the percentage of $TiO_2$ in the quartz should lie between 0.01 to 0.04% by weight in order to substantially eliminate the production of ozone from a germicidal lamp having an envelope made of such quartz in a thickness of approximately 1 millimeter. In general, for other practical wall thicknesses, the required percentages may be approximately determined by dividing the above-given percentages by the ratio of actual wall thickness to a thickness of 1 millimeter.

While a certain specific embodiment of the invention has been shown and described, the same is intended as an illustrative example and not in order to limit the invention thereto. Obviously, the invention is applicable to other discharge lamps differing in shape and configuration from that which has been illustrated. Furthermore, whereas the range of 0.01 to 0.04 per cent by weight of $TiO_2$ in the quartz is the optimum for a wall thickness of 1 millimeter, the range may be shifted depending on the actual thickness selected, such shifting occurring inversely as the ratio of the actual thickness relative to a thickness of 1 millimeter. The appended claims are there-

What is claimed as new and desired to be secured by Letters Patent of the United States is:

1. An ultraviolet lamp comprising an envelope having means therein for producing an electric discharge which emits radiation in the 2500 A. region and also radiation at wave lengths below 2000 A., said envelope consisting of quartz having a predetermined wall thickness and containing a percentage by weight of $TiO_2$ between 0.01 to 0.04% divided by the ratio of said predetermined wall thickness to a wall thickness of 1 millimeter, whereby to substantially suppress transmission of ultraviolet radiation at wave lengths below 2000 A.

2. An ultraviolet lamp comprising an envelope having means therein for producing an electric discharge emitting radiation in the 2500 A. region and also radiation at wave lengths below 2000 A., said envelope consisting of quartz containing 0.01 to 0.04% by weight of $TiO_2$ and having a wall thickness of approximately 1 millimeter, whereby to substantially suppress transmission of ultraviolet radiation at wave lengths below 2000 A.

3. A germicidal lamp comprising an envelope including means for producing an electric discharge which emits ultraviolet radiations both in the 2500 A. region and in the region below 2000 A., said envelope consisting of quartz having a wall thickness of approximately 1 millimeter and containing 0.012 to 0.016% by weight of $TiO_2$, whereby the percentage of its total radiation at wave lengths below 2000 A. is less than 1% of such radiations produced by a similar germicidal lamp having an envelope of pure quartz.

No references cited.